UNITED STATES PATENT OFFICE.

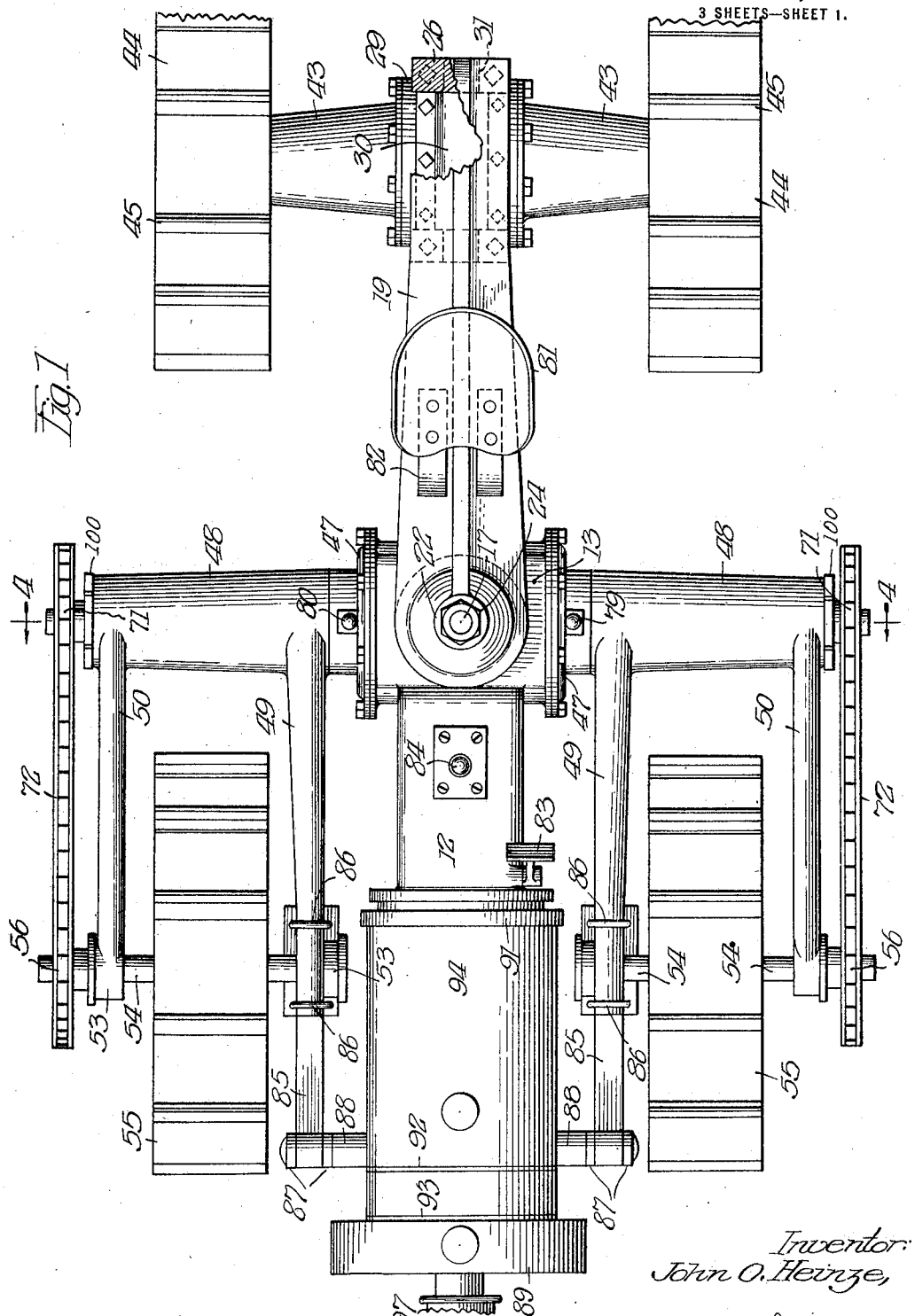

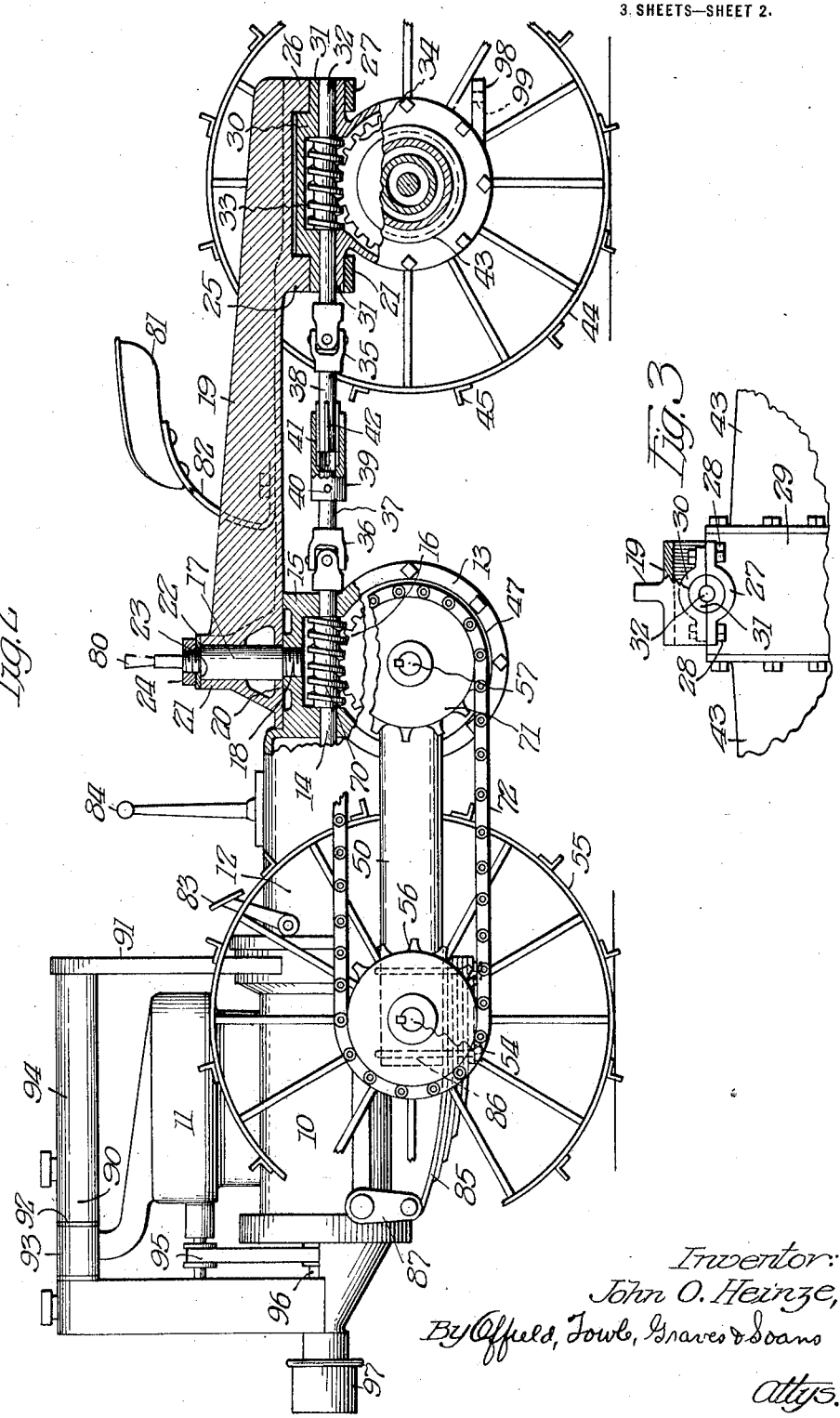

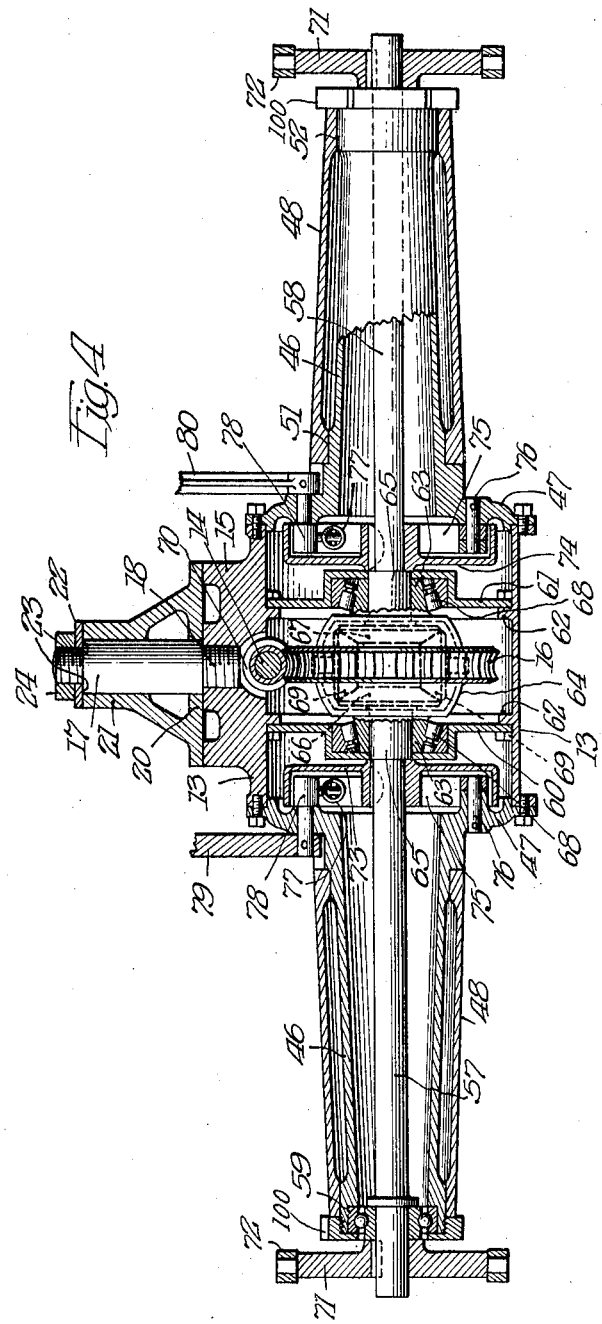

JOHN O. HEINZE, OF BOYNE CITY, MICHIGAN, ASSIGNOR TO TRACTION ENGINE COMPANY, OF BOYNE CITY, MICHIGAN, A CORPORATION OF MICHIGAN.

MOTOR-VEHICLE.

1,393,779. Specification of Letters Patent. Patented Oct. 18, 1921.

Appilcation filed July 19, 1919. Serial No. 312,042.

*To all whom it may concern:*

Be it known that I, JOHN O. HEINZE, a citizen of the United States, residing at Boyne City, in the county of Charlevoix and State of Michigan, have invented certain new and useful Improvements in Motor-Vehicles, of which the following is the specification.

This invention relates to new and useful improvements in motor vehicles, and is particularly applicable to four-wheel-drive vehicles and tractors of the general type commonly employed for drawing agricultural implements and the like, although it is not limited to such use.

The principal objects of my invention are, to construct a self-propelled vehicle in sections, so arranged that one of the sections swings and trails behind the other section; to communicate propelling power to the supporting wheels of both sections from the same source of power; to provide a front and rear wheel drive vehicle in which the required rate of speed of the front and rear wheels is regulated so that a differential or slip connection is not required between the front and rear wheels; to provide a vehicle having a leading section and a trailing section, with means for varying the angular relation of the sections to afford directional control of the vehicle; to provide a vehicle of this character having flexibility to accommodate itself to ground inequalities and with resilience to cushion road shocks; and in general to provide a simple and improved construction for a vehicle of the general character described.

On the drawings in which I have illustrated a preferred form of my invention;

Figure 1 is a top or plan view of a tractor embodying my improvements;

Fig. 2 is a side view thereof, with parts shown in section, disclosing details of construction;

Fig. 3, a fragmentary view of the rear end of the tractor showing the swivel connection of the rear wheels with the frame;

Fig. 4, an enlarged sectional view on line 4—4 of Fig. 1.

Referring to the drawings, the reference numeral 10 indicates the leading section of the tractor frame, which section may consist of the crank case of the engine 11, and its rearwardly extending clutch and transmission case 12, and terminates at the rear end in a differential housing 13. The drive shaft of the motor is connected in the usual manner through the clutch and transmission mechanism in the case 12, with the driving shaft 14, which extends through, and is journaled in an upper extension 15 of the differential housing 13, and has a worm 70 inclosed in said extension 15 and meshing with the worm wheel 16 in the differential housing 13.

The upper extension 15 of the differential housing 13 is provided at the top with a flat seat, having a stub shaft or spindle 17 secured centrally thereto, and extending upwardly therefrom as shown in Fig. 2, said spindle being secured to the extension 15 in any substantial manner, as for example by the threaded lower end 18 engaging in a threaded socket of the extension 15. A trailer arm or frame section 19, which is preferably constructed in longitudinally ribbed form, as shown, to afford strength and light-weight, has a flat bearing 20 at the forward end adapted to rest and rotate on the seat of the extension 15 of the differential housing 13, and this frame section 19 also has a vertical bearing or hub 21 concentric with the bearing surface 18 through which the spindle or stub shaft 17 is inserted. The upper end of the stub shaft 17 is preferably reduced and threaded, and has a washer 22 inserted thereon, so as to bear against the shoulder 22, formed between the stub shaft 10 and the reduced upper end thereof, said washer being held in place by nut 24, threaded onto the reduced upper end of the stub shaft 17. It is to be understood, of course, that this is merely a convenient means which I employ for securing the forward end of the trailer section 19 on the stub shaft 17, so that it will swing horizontally thereabout, and that any other satisfactory means may be employed for the purpose.

The rear end of the arm 19 has a pair of longitudinally spaced depending half bearings 25 and 26, each of which, as shown in Fig. 3, has a detachable cap or half bearing 27 secured thereto by bolts or screws 28, to enable the structure to be assembled. These bearings 25 and 26 with their caps 27 provide horizontal apertures in which the rear differential housing 29 is pivotally secured, said housing being provided with an upward extension 30, having forwardly and rearwardly extending trunnions 31 engaged in the apertures of the depending bearings. The shaft 32 extends through the upper extension 30 of the housing 29, and through the trunnions 31, being concentric therewith, and said shaft has a worm 33 inclosed in the upper extension 30 and meshing with a worm wheel 34 of the differential mechanism within the housing 29.

The forward end of the shaft 32 has a universal or knuckle joint 35 secured thereto and the drive shaft 14 also has a similar universal or knuckle joint 36 at its rear end, which is connected to the knuckle 35 by shaft extensions 37 and 38, having a sliding connection with one another. This sliding connection may be effected in any suitable manner, as for example by the sleeve 39, which is pinned at 40 on the rear end of the shaft 37, and provided with longitudinal keyways 41. The forward end of the shaft 38 is inserted in the rear end of the sleeve, and provided with longitudinal keys 42, which engage in the keyways 41 of the sleeve 39, thereby permitting relative longitudinal movement of the shafts 37 and 38, and yet insuring a positive rotary driving connection therebetween.

Extending laterally at each side of the rear differential 29 are tubular housings 43, and at the outer end of each is mounted a ground wheel 44 of the usual broad faced type with peripheral ribs 45, if desired, to insure propelling engagement with the surface of the ground. The differential mechanism of the rear differential housing 29 is not shown, as it may be of any well-known type having a pair of shafts, each extending outwardly through one of the tubular extensions 43, and differentially operable by the worm wheel 34, and each connected with one of the wheels 44, for communicating propelling power thereto.

The front differential mechanism and housing 13 is similar to that shown in my application, filed May 26, 1919, and bearing Serial No. 299,865, being constructed to afford directional control of the tractor.

A tubular housing 46 (see Fig. 4) is rigidly bolted to each side of the differential housing 13, each tubular housing being provided at its inner end with an annular flange 47 for this purpose. In the preferred form, each housing 46 is outwardly tapered and its exterior constitutes a bearing upon which is mounted to oscillate a corresponding wheel yoke 48. Each wheel yoke comprises a hub which is journaled on one of the tubular housings 46, and a pair of laterally spaced arms 49 and 50, extending in parallel relation forwardly from the hub. The interiors of the yoke hubs are preferably cored out, so as to bear upon the tubular housings 46 at their ends only, as clearly shown at 51 and 52 in the Fig. 4.

The outer end of each yoke arm 49 and 50 is formed with a bearing 53, within which is mounted an axle which has a tractor wheel 55, similar to the tractor wheels 44, secured thereto intermediate of the arms 49 and 50 of the yokes, the outer end of this axle being extended beyond the bearing 53 of the arm 50, and there provided with a sprocket wheel 56, which is keyed to the axle or otherwise connected to rotate therewith.

Referring to the forward differential and its associated mechanism, it will be observed by referring to Fig. 4 that the axle is composed of two alined shaft sections 57 and 58. The outer end of the shaft sections are carried in roller bearings 59, mounted in the ends of the tubular housings 46, and held therein by an end cap 100, threaded or otherwise secured onto the outer end of the housing 46, as best seen at the left hand end of Fig. 4, and the bearing engages the shaft so as to hold the latter from withdrawal. To support the inner ends of these shaft sections and associated gear mechanism, diaphragm plates 60 and 61 are provided within the differential housing 13, the latter being for this purpose provided with internal flanges 62, to which the peripheries of the plates 60 and 61 are bolted. The plates 60 and 61 are centrally recessed to receive the hub-like extensions 63 of the differential annulus 64, and to receive the hub part 65 of the adjoining differential gears 66 and 67, said hub parts being connected with their respective shafts. An annular bearing 68 is mounted in the central recess of each diaphragm plate 60 and 61, and engages the hub-like extensions 63 of the differential annulus 64.

The annulus 64 carries upon its interior a plurality of differential bevels 69, which are journaled upon radially disposed bearing pins of the annulus and mesh with both bevel gears 66 and 67. This construction is not shown in detail, as it is similar to the well-known type of bevel gear differential, and therefore does not require detailed illustration for an understanding of same. The outer periphery of the annulus 64 comprises the worm wheel 16, which as hereintofore stated, is in mesh with the worm 70 of the drive shaft 14.

The outer end of each shaft 57 and 58 has a sprocket 71 keyed or otherwise secured thereon, each of which is connected with the corresponding sprocket 56 of a forward tractor wheel by a chain 72, so that the operation of the differential shafts 57 and 58 is communicated to its corresponding tractor wheel. In order to steer the tractor in a simple and efficient way, I provide retarding mechanism for each differential shaft 57 and 58 like that shown and described in my application filed May 26, 1919, Serial No. 299,865. This mechanism comprises brake drums 73 and 74 respectively, which are secured on respective shafts 57 and 58 within the differential housing 13, and each drum contains a pair of brake shoes 75, which are pivotally mounted within the drum 73 or 74, as the case may be, on a pin 76 extending inwardly from the adjoining flange 47, said brake shoes being normally held from engagement with the drum 73 or 74 by a spring 77. A spreader 78 is inserted between the ends of each pair of brake shoes 75, and is operated by a lever to expand the shoes into engagement with the brake drums, the lever for operating the expander in the brake drum 73 being indicated by reference number 79 and the lever for the expander in the other brake drum being indicated by reference number 80.

It will be apparent that by operating either lever 79 or 80 to expand the brake shoes operated thereby, the corresponding drum 73 or 74 is engaged, so that the movement thereof is retarded or completely arrested, such retardation or arresting of the movement thereof serving to slow down or arrest the movement of the corresponding differential shaft 57 or 58 and its corresponding tractor wheel 55, whereupon, due to the differential mechanism, the other differential shaft and its tractor wheel continue their operation at a correspondingly accelerated speed, thereby effecting a turning movement of the forward end of the tractor.

A seat 81 is mounted on spring supports 82 on the trailer arm 19 in a convenient position, so that the occupant may readily operate the steering levers 79 and 80, and there is also a clutch pedal 83 and a transmission gear shift lever 84 extending above the clutch and transmission case 12, in a convenient position for operation by the occupant of the seat 81.

For affording a resilient support of the tractor frame, and particularly the engine, a quarter elliptic spring 85 is shackled to the forward end of each yoke arm 49 by U bolts 86 or other satisfactory fastening devices, and the forward end of each spring 85 is pivotally connected by means of a link or links 87 with a stud 88 extending laterally from the corresponding side of the crank case or engine base 10, or other frame part of the tractor, which may be conveniently available for this purpose.

A radiator 89 is mounted at the front of the engine 11, and has a rearwardly extending tank 90 connected to the top thereof, and held at the rear end by a suitable support 91 which may serve as an instrument board if desired. This tank may be divided by a partition 92 onto a forward portion 93, which is connected with the water jacket of the engine, and a rear portion 94 which may serve as a gasolene or fuel tank. The usual fan drive 95 is connected with the crank shaft 96 of the engine, and the latter extended forwardly beyond the radiator 89, and provided with a jack pulley 97, so that the motor of the tractor may be utilized, if desired, to operate other machinery. For affording a draft connection or hitch for the implement to be drawn by the tractor, the rear differential housing 29 is formed with or has attached thereto a rearwardly extending plate 98 apertured at 99, to enable a connection to be made thereto.

In the operation of the tractor, the motor or engine 11 is set in operation and the driving connection thereof with the drive shaft 14 effected through the manipulation of the clutch pedal 83 and gear shift lever 84 in the usual manner. The operation of the drive shaft 14 communicates power through the worm 70 directly to the differential mechanism of the front differential housing 13, and through the knuckle joints 35 and 36 and the sliding shaft connection 39 to the rear shaft 32, which latter through the engagement of its worm 33 with the worm wheel 34 imparts power simultaneously to the differential mechanism of the rear housing 29.

Directional control is afforded to the tractor by selectively operating the control levers 79 and 80, so as to retard either one of the front tractor wheels 55, and as the direction of movement of the tractor is thereby changed, the arm 19 and rear supporting wheels 44 act as a trailer, swinging about the vertical stub shaft 17, so as to readily follow the direction of movement assumed by the forward or leading section of the tractor, such trailing movement of the rear section of the tractor enabling the implement drawn thereby to more readily make the necessary turns to follow the course of the tractor.

It will be understood that the connection of the rear shaft 32 with the drive shaft 14 through the medium of the universal joints 35 and 36 and the sliding shaft connection 39 enables the trailer section to swing about the pivot or stub shaft 17 and maintains the driving connection between the leading section and trailing section of the tractor in the various relative positions which may be assumed thereby.

It will also be observed that the motor or engine is mounted at the forward end of the tractor over the front wheels 55, and as the forward or leading section of the tractor is connected to the wheels by the springs 85, road shocks are effectively absorbed and communication thereof to the engine prevented. The road shocks affecting the rear wheels of the tractor are also counteracted by the forward mounting of the engine, which tends to counter-balance to some extent the rear portion of the tractor, so that elevation or depression of the rear wheels effects a responsive yielding of the springs 85 and absorbs road shocks on the rear wheels.

It will also be observed that each yoke 48 is independently movable about its axis, and each resiliently held at its free end by a spring 85, thereby permitting the forward wheels 55 to yield independently to variations in the road surface, and furthermore that pivotal connection of the rear differential housing 29, and trailer arm 19 on an axis concentric with the shaft 32 permits the front and rear pairs of wheels to swing laterally independently of each other, according to variations in the road surface, and at the same time permits uninterrupted communication of power between the sections of the tractor supported by these pairs of wheels.

A feature of this invention to which particular attention is directed is the connection of the leading and trailing sections, so that the latter section follows substantially in the path of the front or leading section, instead of at one side of the path, as in vehicles of the usual construction. This results from the pivotal connection of the two sections intermediate of the front and rear wheels of the tractor, whereby when the front section is steered toward one side the rear end of such section swings toward the other side and leads the trailing section, so that the wheels thereof follow substantially in the path of the front wheels. The longitudinal axes of the leading section and trailing section, in making a turn assume positions substantially as adjoining chords of the curved line of direction of movement of the tractor, which chords meet at the vertical pivotal connection of the leading and trailing sections, and both the front and rear wheels therefore correspondingly straddle the curved center line of the path of the tractor.

An important result of this construction is that although the inside and outside wheels of both the front and rear pairs of wheels rotate at differential speeds, the mean speed of the two front wheels, and of the two rear wheels is substantially the same, and a differential or slip connection between the driving mechanisms of the front and rear wheels is not required as in the usual four-wheel-drive vehicles.

While I have shown and described my invention in what now appears to me to be the preferred embodiment thereof, it is to be understood that I contemplate various changes and modifications in the application of my invention, the scope of which is to be determined by the appended claims.

I claim as my invention:

1. In a vehicle, the combination of a frame comprising a leading section and a trailing section vertically pivoted to the rear end of the leading section, a pair of supporting wheels pivotally connected on a longitudinal axis to one of the sections, a pair of supporting wheels, each resiliently connected to the other section and independently oscillatable, and a motor having a driving connection for simultaneously operating the supporting wheels of both sections.

2. In a vehicle, the combination of a frame having a pair of supporting wheels pivotally connected thereto at the rear end on a longitudinal axis, a pair of supporting wheels at the forward end of the frame, each resiliently connected with the frame and independently oscillatable, a motor on the frame and driving connections for simultaneously operating the supporting wheels at both ends of the frame from the motor.

3. In a vehicle, the combination of a longitudinal frame resiliently supported on a pair of independently oscillatable arms which are horizontally pivoted to the frame intermediate of its ends and extend toward one end thereof, a pair of supporting wheels horizontally pivoted on the other end of the frame to swing on a longitudinal axis, a supporting wheel on the outer end of each arm, and a motor on the frame for propelling the vehicle.

4. In a vehicle, the combination of a longitudinal frame comprising leading and trailing sections having their inner ends pivoted together, a pair of horizontally pivoted arms at opposite sides of one of the sections and resiliently connected therewith, a supporting wheel carried by each arm, a pair of supporting wheels at the outer end of the other frame section, and a motor on the frame for propelling the vehicle.

5. In a vehicle, the combination of a frame comprising a leading section, and a trailing section vertically pivoted to the leading section, a differential mechanism on the leading section having a pair of differential shafts extending laterally therefrom, one at each side of the frame, a yoke pivoted at each side of the frame having its pivotal axis concentric with the corresponding differential shaft, a spring resiliently connecting the free end of each yoke with the leading section of the frame, means for selectively retarding each of said differential shafts, a differential mechanism at the rear end of the trailing section having a pair of supporting wheels operatively connected therewith, and a motor on the leading section provided with driving connections for simultaneously operating both differential mechanisms.

6. In a vehicle, the combination of a longitudinal frame oscillatably supported intermediate of its ends on a pair of wheels, a pair of supporting wheels mounted on one end of the frame, and resilient means interposed between the other end of the frame and the first mentioned pair of wheels.

7. In a vehicle, the combination of a longitudinal frame having a pair of supporting wheels at each end, one of said pairs being swingingly connected to the frame intermediate of the ends of the frame, and resilient means interposed between one end of the frame and said last mentioned pair of supporting wheels.

8. In a vehicle, the combination of a longitudinal frame having laterally projecting supports on opposite sides thereof intermediate of the ends, a wheel bracket pivoted on each support and extending forwardly therefrom and having a supporting wheel mounted at the forward end thereof, a spring interposed between the forward end of each bracket and the corresponding end of the frame, a motor on the forward end of the frame having driving connections with said wheels, and a pair of supporting wheels on the rear end of the frame.

9. In a vehicle, the combination of a longitudinal frame comprising front and rear sections pivoted together intermediate of the ends of the frame, a support extending laterally at each side of the frame adjacent the pivotal connection of the two sections, a bracket pivoted on each support and extending forwardly therefrom, a supporting wheel mounted at the forward end of each bracket, a resilient connection between the forward end of each bracket and the corresponding end of the frame, a motor on the frame having differential driving connection with said wheels, and a pair of supporting wheels at the rear end of the frame.

10. In a vehicle, the combination of a frame comprising a leading section and a trailing section pivoted to the rear end of the leading section, a differential mechanism at the intersection of the two sections having a support extending laterally therefrom at each side, a wheel bracket pivoted on each support and extending forwardly therefrom and having a wheel mounted at the forward end thereof, a resilient connection between the forward end of each bracket and the forward end of the leading section, driving connections from the differential mechanism to each of said wheels, a motor operatively connected with the differential mechanism, and a pair of supporting wheels at the rear end of the trailing section.

11. In a vehicle, the combination of a motor having a differential mechanism at the rear end operated thereby, a support extending laterally at each side of the differential mechanism, a bracket pivoted on each support and extending forwardly therefrom and having a wheel mounted in the forward end thereof, a resilient connection between the forward end of each bracket and the forward end of the motor, a driving connection from the differential to each of the said wheels, a trailing section pivoted to the differential housing, a differential mechanism at the rear end of the trailing section operated from the motor, and a pair of supporting wheels at the rear end of the trailing section operated by said differential mechanism.

12. In a vehicle, the combination of a longitudinal frame comprising a leading section, a trailing section vertically pivoted to the leading section, a pair of arms embracing one of the sections and horizontally pivoted to the frame at the juncture of the two sections, a supporting wheel at the outer end of each arm, means resiliently connecting the outer end of each arm with the section of the frame embraced thereby, a wheel support at the outer end of the other section, and a motor on the frame for propelling the vehicle.

13. In a vehicle, the combination of a longitudinal frame comprising a leading section having a trailing section vertically pivoted thereto, a differential mechanism at the juncture of the two sections, a pair of arms embracing one of the sections and horizontally pivoted to the frame adjacent the juncture of the sections, a supporting wheel on each arm operatively connected with the differential mechanism, resilient means connecting the arms with the section embraced thereby, a motor on the frame operatively connected with the differential mechanism, and a wheel support at the outer end of the other section.

14. In a vehicle, the combination of a longitudinal frame comprising a leading section having a trailing section vertically pivoted thereto, a differential mechanism at the juncture of the sections, a pair of arms embracing one of the sections and horizontally pivoted to the frame at opposite sides of the differential mechanism and resiliently connected with the section of the frame embraced thereby, a supporting wheel on each arm operatively connected with the differential mechanism, a differential mechanism at the outer end of the other section having a supporting wheel at each side thereof, and a motor on the frame operatively connected with both differential mechanisms.

15. In a tractor, the combination of a frame comprising a leading section with an arm extending rearwardly therefrom, a pair of front supporting wheels on the leading section, a differential housing pivoted to the under side of and at the rear end of the arm on a longitudinal axis of the tractor, a motor on the leading section having driving connections with the front supporting wheels, and a shaft under the aforesaid arm having a universal joint adjacent the said differential housing, and a universal joint adjacent the leading section for communicating power to the rear supporting wheels from the motor.

JOHN O. HEINZE.